C. C. STRANG.
FISHING REEL.
APPLICATION FILED JULY 1, 1916.
1,256,389.
Patented Feb. 12, 1918.
2 SHEETS—SHEET 2.
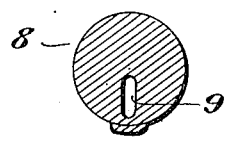
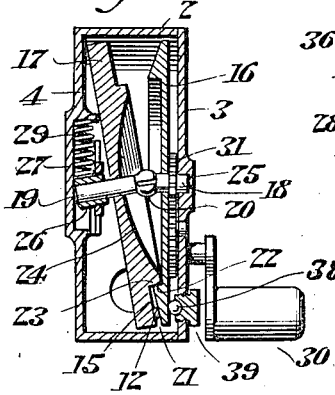
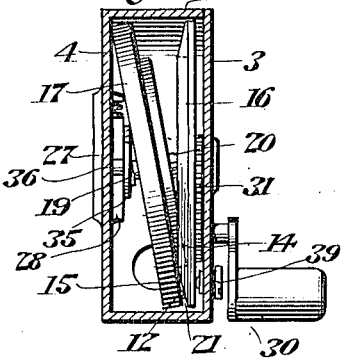
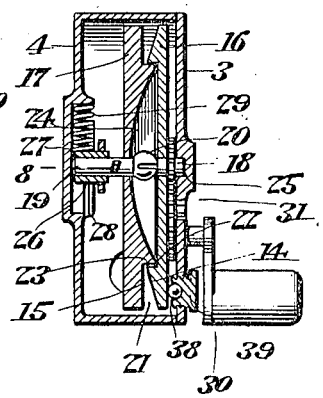
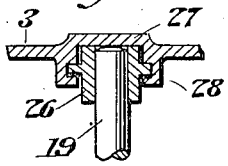
Witnesses
Inventor
C.C. Strang
By Victor J. Evans
Attorney

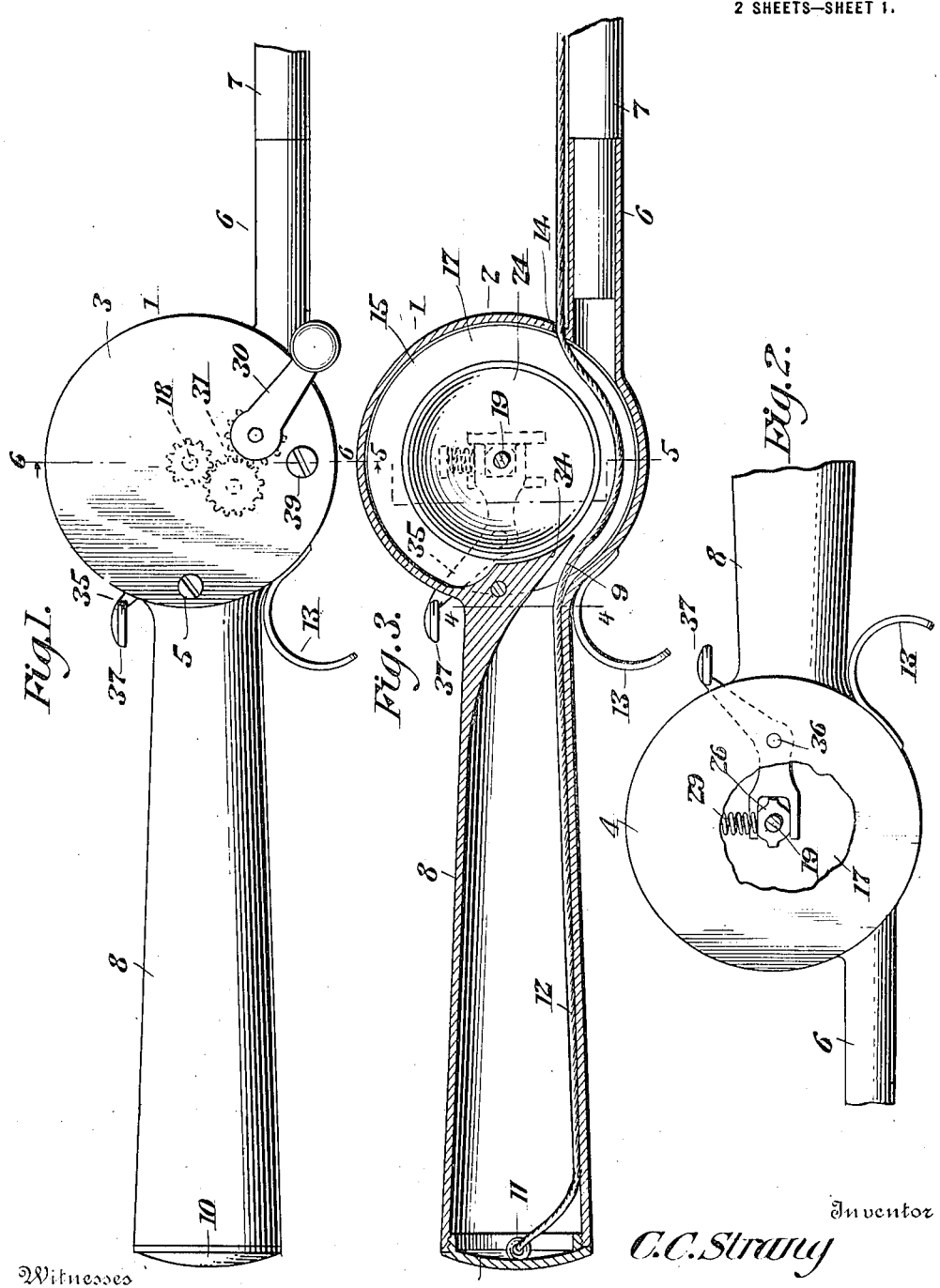

UNITED STATES PATENT OFFICE.

CASSIUS C. STRANG, OF ALEXANDRIA, MINNESOTA.

FISHING-REEL.

1,256,389.      Specification of Letters Patent.      Patented Feb. 12, 1918.

Application filed July 1, 1916. Serial No. 107,144.

*To all whom it may concern:*

Be it known that I, CASSIUS C. STRANG, a citizen of the United States, residing at Alexandria, in the county of Douglas and State of Minnesota, have invented new and useful Improvements in Fishing-Reels, of which the following is a specification.

This invention relates to fishing line reels, and particularly to casting reels, the primary object of the invention being to provide a reel in which the construction is such as to allow the line to run out evenly and smoothly and without liability of the line snarling and tangling, as in reels of ordinary construction.

A further object of the invention is to provide a reel embodying friction disks normally disposed in a position to grip the line for a holding and winding action, the gripping action being restricted in area to diminish resistance to the working motion of the parts during the winding action, and provision being made for adjusting the disks for a releasing action to permit the line to freely run out for casting.

A further object of the invention is to provide a reel wherein provision is made for storing the wound portion of the line within an inclosing chamber which may form the handle of the rod, thus avoiding the necessity of winding the line upon a reel drum proper and obviating the disadvantages thereto.

A still further object of the invention is to provide a novel construction of line gripping, winding and releasing means allowing maximum freedom of motion, together with means for increasing the normal gripping action to prevent slipping of the line when a heavy pull or drag upon the line occurs, as when a heavy or very active fish is hooked.

With these and other objects in view, the invention consists of the features of construction, combination and arrangement of parts hereinafter fully described and claimed, reference being had to the accompanying drawings in which:—

Figure 1 is a side elevation of the device as applied to a casting rod, a portion only of the rod being shown.

Fig. 2 is a view looking toward the opposite side of the reel casing.

Fig. 3 is a vertical longitudinal section through the device taken on a line between the meeting faces of the friction disks.

Fig. 4 is a vertical transverse section on the line 4—4 of Fig. 3.

Fig. 5 is a similar view on the line 5—5 of Fig. 3.

Figs. 6 and 7 are vertical transverse sections on the line 6—6 of Fig. 1 showing the friction disks in line gripping and releasing position.

Fig. 8 is a detail section on the line 8—8 of Fig. 7.

In the practical embodiment of my invention as herein disclosed I provide a reel comprising a casing 1 including a cylindrical body wall 2 and side walls 3 and 4, one of said side walls, as the wall 4, being preferably removable and secured in position by screws or other suitable fastenings 5, whereby access to the interior of the casing may be obtained for the purpose of assembling, disassembling, cleaning, oiling, repairing and replacing parts. Extending from the lower forward portion of this casing is a tubular stem or socket 6 which may be constructed to receive the butt end of the casting rod 7, which may be secured in position in any desired manner, while from the rear portion of the casing extends a tubular stock 8 in communication at its forward end with the lower rear portion of the casing through an elongated passage 9 and normally closed at its rear end by a screw plug or cap 10 having an eye 11 to which one end of the line 12 is normally fastened. This stock 8 forms a chamber or storage reservoir to receive the wound up portion of the line and also serves as a grip or handle by which the rod may be held and manipulated. The casing or stock may be provided with the usual curved forefinger receiver or rest 13.

At its lower forward portion the casing is provided with an opening or passage 14 for the extension of the line therefrom outwardly through the guides upon the rod. In practice one end of the line is left free to receive the hook and lure while the other end of the line is secured, as stated, to the eye 11 and the portion of the line not run out or extended for use is stored within the chamber of the hollow handle 8, instead of being wound upon a reel drum in the usual manner. The portion of the line which passes through the casing extends between the gripping surfaces 14 and 15, respectively, of a pair of rotary friction disks 16 and 17. These disks are respectively fixed to the sections 18 and 19 of a transversely divided shaft, which shaft sections are united by a ball and socket or other suitable type of universal joint 20, adapted to permit said shaft sections to have relative universal pivotal movements. The gripping surface 14 of the disk 16 is beveled and the coacting gripping surface 15 of the disk 17 straight or said surfaces otherwise constructed to provide a normally flaring or V-shaped groove or space 21 between them for the guidance of the line and frictional gripping action of said surfaces upon the line. The surfaces 14 and 15 are arranged marginally adjacent to the peripheries of the disks and terminate at their inner portions in shoulders 22 and 23 which close said groove or space 21 to prevent the line from passing farther inwardly between the faces of the disks. The inner face of one of the disks inside the annular shoulder thereof, as that of the disk 17, is preferably concaved or recessed, as shown at 24, to provide a receiving space for the universal joint and to permit relative tilting motions of the disks while adapting them to turn or rotate as a unit.

The shaft section 18 is journaled to rotate in a fixed plane in a bearing recess 25 in the side wall 3 of the casing, while the section 19 of the shaft is journaled to rotate in a floating bearing 26 movable in a direction perpendicular to the plane of the stock and rod in a chamber or recess 27 formed upon the wall 4 and between guide members 28 thereon, a spring 29 of the coiled type being disposed between said bearing and a wall of said recess to exert pressure in a downward direction, whereby the shaft section 19 will be normally forced downward and the lower portion of the friction face 15 of the disk 17 held parallel with the inclined face 14 of the disk 16 to grip the line, the disk 17 being in such action tilted at an angle to the disk 16, as shown in Fig. 6. The line will thus be normally held and gripped in a secure manner against outward motion and so that by rotating the usual crank 30 journaled upon one of the side walls of the casing motion may be communicated to the shaft section 18 through a suitably arranged train of gears 31 to wind or unwind the line, which in its winding or unwinding actions will feed into the storage chamber of the handle 8 or outwardly therefrom.

Arranged upon the casing above the line passage 9 is a tapered guard finger or projection 34 which extends sufficiently between adjacent portions of the disks to insure guidance of the line to the passage 9 and prevent the line from winding around the disks. The bearing 26 is provided at diametrically opposite sides with suitable surfaces to fit between and engage the forked end of a pressure and release lever 35 which is fulcrumed upon the wall 4 of the casing, as indicated at 36, and which has an outwardly projecting actuating arm or thumb piece 37, whereby said lever may be operated to tilt the shaft section 19 and disk 17 in opposition to and against the resistance of the spring 29 to dispose the disks in parallel relation, as shown in Fig. 7, thus bringing the shaft sections into longitudinal alinement and moving the friction surfaces 14 and 15 relatively to space them apart for the formation of the flaring passage or groove 21, whereby the line may be released so that it may be cast or run out. By means of this lever also the shaft section 19 may be tilted in the same direction in which it is normally tilted by the spring 29, so that the frictional pressure between the friction surfaces of the disks may be increased to correspondingly increase the gripping pressure on the line so that the line may be more firmly gripped and held when occasion requires, as when a heavy drag or pull upon the line occurs in hooking a heavy or vigorous fish. The portion of the disk 16 in the direct line of gripping pressure is preferably backed and reinforced by an anti-friction bearing ball or member 38 seated in the socket of a suitable holder, such as a screw plug 39, said bearing ball permitting the disk 16 to have free rotary motion while backing it against any tendency to tilt under pressure out of proper working position.

It will be understood from the foregoing description that the improved reel dispenses with the use of an ordinary reel drum around which the line is wound, the line being normally stored in the chamber of the handle 8 and wound in and out by means of the rotary gripping device formed by the gripping disks 16 and 17, which may be controlled to entirely or partially to any degree release their grip upon the line so that the outward unwinding or running action of the line may be controlled to an absolute nicety. By thus dispensing with the use of an ordinary reel drum around which the line winds the liability of the line snarling, kinking or tangling during the casting or unwinding action is avoided, since no portion of the line will loop or feed at any faster rate than the remaining portions thereof as occurs in the use of a reel where the reel is liable to rotate and let off the immediate portions of the line faster than the rate of travel of the free end of the line. Furthermore, as the rate of speed of travel of the line is not controlled in a variable manner by variations of diameter of a winding device, as in the use of a reel drum, a more reliable and uniform winding and unwinding action may be obtained. The described construction of the gripping and feeding means also allows greater flexibility of braking action and control of the line, as will be readily understood.

While the construction herein disclosed is preferred, it will of course be understood that changes in the form, proportions, construction and arrangement of parts may be varied within the scope of the invention as defined in the appended claims without departing from the spirit or sacrificing any of the advantages of the invention.

I claim:—

1. A fishing reel including a receptacle for the line, a rotary line feeder composed of a pair of coaxially mounted relatively movable gripping members, comprising disks having juxtaposed sides forming gripping faces, one of said disks being rotatable upon a tilting axis, and means for tilting said disk upon its axis for moving the gripping face thereof into and out of gripping position with relation to the gripping face of the other disk.

2. A fishing reel including a receptacle for the line, a rotary line feeder composed of gripping disks one tiltable axially with relation to the other, means for normally holding the gripping disks in line gripping position in all positions of the reel, and means for throwing the disks out of line gripping position.

3. A fishing reel including a receptacle for the line, a rotary line feeder composed of friction gripping disks, one axially tiltable with relation to the other, means for throwing the disks out of gripping position, and means for stripping the line from the disks for passage into said receptacle.

4. A fishing reel including a receptacle for the line, a rotary feeder comprising a pair of gripping disks, one tiltable axially with relation to the other, means for normally holding the disks in gripping engagement in all positions of the reel, and means for throwing the disks out of gripping engagement, said means also serving as means for increasing the gripping action of the disks.

5. A fishing reel including a receptacle for the line, a rotary feeder composed of a pair of gripping disks having lateral gripping faces, one of said disks being tiltable with relation to the other to throw the lateral gripping faces thereof into and out of gripping position, means for normally holding said disks in gripping position, and means for throwing the disks out of gripping position to release the line.

6. A fishing reel including a receptacle for the line, a rotary shaft comprising jointed sections, friction gripping disks carried by said shaft sections, means for yieldingly holding one of the shaft sections and its disk at an angle to dispose the disks in gripping engagement, and means for adjusting the latter-named shaft section and disk to throw the disk out of gripping engagement.

7. A fishing reel including a line feeder comprising a pair of coaxially mounted gripping disks having lateral gripping faces, one of said gripping disks being tiltable laterally upon its axis into and out of gripping position, and means for tilting said tilting disk.

8. A fishing reel including a rotary line feeder composed of a pair of gripping disks, one of said disks being mounted for rotation in a fixed plane, and the other of said disks being mounted for rotation with and upon a tilting axis, and means for tilting said axis to throw the disk carried thereby laterally into and out of gripping engagement with relation to the first-named disk.

9. A fishing reel including a casing, a shaft composed of jointed sections, one of said sections having a floating bearing, friction gripping disks carried by said shaft sections, yielding means acting upon the shaft section having the floating bearing for holding said shaft section and its disk at an angle for gripping coaction with the other disk, and a releasing device acting upon the floating shaft section in concert with or in opposition to said yielding means for increasing or diminishing the frictional engagement between the disks.

10. A fishing reel including a casing, a shaft composed of jointed sections, one of said sections having a floating bearing, friction gripping disks carried by said shaft sections, yielding means acting upon the shaft section having the floating bearing for holding said shaft section and its disk at an angle for gripping coaction with the other disk, and a releasing device acting upon the floating shaft section in concert with or in opposition to said yielding means for increasing or diminishing the frictional engagement between the disks, and means for backing the disk carried by the other shaft section along the line of gripping pressure.

11. A fishing reel including a receptacle for the line, a line gripping disk mounted for rotation upon a fixed axis, a second disk mounted for rotation with the first disk upon a tilting axis, for tilting motion toward and from said first disk, means for normally holding the second disk tilted to dispose the disks in line gripping position, and means for tilting the tilting disk out of gripping position.

12. In a fishing reel including a pair of rotary gripping disks having lateral gripping faces, one of said disks being tiltable laterally upon its axis with relation to the other to throw the gripping faces of the disks into and out of gripping relation, means for normally holding the tilting disk in gripping position, and means for moving the same out of gripping position.

13. A fishing reel including a rotary line feeder comprising a pair of gripping disks having lateral gripping faces, one of said gripping disks being tiltable upon its axis laterally with relation to the other disk to throw the gripping faces of the disks into and out of gripping position, a spring acting upon the tilting disk for normally holding the same in gripping position, and means for tilting said disk out of gripping position in opposition to said spring.

14. A fishing reel including a rotary line feeder composed of a pair of rotary gripping disks having lateral gripping faces, one of said disks being mounted upon a tilting axis for lateral tilting motion into and out of gripping position with relation to the other disk, and means for tilting said disk.

15. A fishing reel including a receptacle for the line, and a line feeder comprising a pair of rotary gripping disks having lateral gripping faces, one of said disks being tiltable on its axis laterally with relation to the other disk to bring the gripping faces of the disks into and out of gripping position, and a fixed stripper projecting in proximity to the gripping faces of the disks for releasing the line therefrom and guiding the same into said receptacle.

16. A fishing reel including a casing having an outlet for the line at one side thereof, a storage receptacle for the line at the opposite side thereof, a gripping device within the casing for gripping the line for a holding and feeding action, said gripping device comprising a pair of disks having lateral gripping faces, one of said disks being tiltable on its axis into and out of gripping relation to the other disk, means for rotating said disks for a feeding action, means for tilting the tilting disk for throwing said gripping device into and out of gripping engagement with the line, and stationary stripping means operative for releasing the line from the gripping device in the winding action and guiding the line into said receptacle.

17. The combination with a hollow handle adapted to be attached to a fishing rod forming a line receptacle, of a housing opening into the handle and adapted to be located between the handle and the engaged rod, gripping means mounted for rotation in the housing and arranged side by side, said means being revoluble in converging planes and coöperating to bind upon a line, and means for rotating said means to feed the line through the housing and into the handle.

18. A fishing reel including a receptacle for the line, and a rotary line feeder composed of relatively movable gripping members, one tiltable axially with relation to the other, and means for moving the same into and out of gripping position.

19. A fishing reel including a receptacle for the line, a rotary line feeder composed of gripping disks, one tiltable axially with relation to the other, means for normally holding the gripping disks in line gripping position with their axes along intersecting lines, and means for throwing the disks out of line gripping position.

20. A fishing reel including a receptacle for the line, a rotary feeder composed of a pair of gripping disks, one axially tiltable with relation to the other to throw the gripping faces thereof into and out of gripping position, means for normally holding said disks in gripping position with their axes along intersecting lines, and means for throwing the disks out of gripping position to release the line.

In testimony whereof I affix my signature.

CASSIUS C. STRANG.